(12) United States Patent
Furuskär et al.

(10) Patent No.: US 10,313,910 B2
(45) Date of Patent: Jun. 4, 2019

(54) COORDINATED SCHEDULING IN LOW INTERFERENCE RESOURCE BLOCKS

(71) Applicant: Telefonaktiebolaget LM Ericsson (publ), Stockholm (SE)

(72) Inventors: Anders Furuskär, Stockholm (SE); Andreas Höglund, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/560,237

(22) PCT Filed: Mar. 30, 2015

(86) PCT No.: PCT/EP2015/056852
§ 371 (c)(1),
(2) Date: Sep. 21, 2017

(87) PCT Pub. No.: WO2016/155765
PCT Pub. Date: Oct. 6, 2016

(65) Prior Publication Data
US 2018/0054751 A1 Feb. 22, 2018

(51) Int. Cl.
*H04W 24/10* (2009.01)
*H04W 28/16* (2009.01)
(Continued)

(52) U.S. Cl.
CPC ............ *H04W 24/10* (2013.01); *H04W 4/70* (2018.02); *H04W 28/16* (2013.01); *H04W 72/082* (2013.01); *H04W 72/1231* (2013.01)

(58) Field of Classification Search
CPC . H04W 28/16–28/26; H04W 72/0433; H04W 72/082
See application file for complete search history.

(56) References Cited

U.S. PATENT DOCUMENTS

| | | | |
|---|---|---|---|
| 2010/0151876 A1* | 6/2010 | Park | H04W 72/082 455/452.2 |
| 2012/0115499 A1* | 5/2012 | Lin | H04W 72/082 455/452.2 |

(Continued)

FOREIGN PATENT DOCUMENTS

| | | |
|---|---|---|
| EP | 2242296 A1 | 10/2010 |
| WO | 2009097070 A1 | 8/2009 |
| WO | 2014146711 A1 | 9/2014 |

OTHER PUBLICATIONS

Asadi, A., et al., "A Survey on Device-to-Device Communication in Cellular Networks," IEEE Communications Surveys & Tutorials, vol. 16, Issue 4, Apr. 24, 2014, pp. 1801-1819.

*Primary Examiner* — Pao Sinkantarakorn
(74) *Attorney, Agent, or Firm* — Coats & Bennett, PLLC

(57) ABSTRACT

The invention provides a method for coordinating a wireless data exchange between communication entities (10) and base transceiver stations (100-104) in at least one cellular network. The method comprises the steps of estimating a need of transmission resources needed for the data exchange between the communication entities (10) and the base transceiver stations (100-104) controlled by the central control entity (200), determining first resource blocks from possible resource blocks, to which the data exchange between the communication entities (10) and the base transceiver stations (100-104) should be limited, the possible resource blocks indicating the resource blocks that are available for the data exchange between the communication entities (10) and the base transceiver stations (100-104), determining a maximum interference level that should not be exceeded in the first resource blocks, the maximum interference level taking into account the signal exchange from one of the communication entities (10) with a base transceiver station other than a serving base transceiver station serving said one (Continued)

communication entity, and informing the base transceiver stations (100-104) about the first resource blocks and the maximum interference level.

8 Claims, 5 Drawing Sheets

(51) Int. Cl.
*H04W 72/12* (2009.01)
*H04W 4/70* (2018.01)
*H04W 72/08* (2009.01)

(56) References Cited

U.S. PATENT DOCUMENTS

| | | |
|---|---|---|
| 2013/0022010 A1 | 1/2013 | Qianxi et al. |
| 2013/0223401 A1 | 8/2013 | Kitahara |

\* cited by examiner

COORDINATED SCHEDULING IN LOW INTERFERENCE RESOURCE BLOCKS

TECHNICAL FIELD

The invention relates to a method for coordinating a wireless data exchange between communication entities and base transceiver stations in at least one cellular network by a central control entity and to a corresponding control entity. The invention furthermore relates to a method for scheduling the wireless data exchange by the base transceiver station and to the corresponding base transceiver station.

BACKGROUND

Machine Type Communication (MTC) usually refers to communication performed by devices which are not directly used by a person, sometimes also denoted "Internet of Things", and e.g. includes use cases such as monitoring water, gas and electricity meters. Data to be transmitted by such types of devices usually has small amounts and requires infrequent transmissions. Often, these devices, like meters monitoring water or gas, are in a fixed location and have no access to a fixed communication line. Instead, the usual small amount of data is transmitted using a mobile communications network. In this context, good coverage is required since the meters or sensors are often located deep indoors or underground in basements. MTC devices are further often of low complexity and have reduced capabilities such as one receiving antenna, a device bandwidth smaller than the system bandwidth etc. compared to normal mobile entities. The power consumption of these meters or sensors should be low in order to prolong battery life.

Coverage is affected by how strong a signal S can be produced at the receiver, and the noise N and interference I levels at the same point. The parameters S, N and I determine the signal quality which can be measured as a ratio between S and I+N, often denoted as SINR.

In the uplink direction, different communication entities such as MTC devices are scheduled in their serving cell with a low power at the serving base station transceiver. As will be explained in more detail below, these devices are very sensitive to interference from a legacy mobile entity served by a neighboring cell. A communication entity whose transmission is received at a low signal level by the serving cell usually also generates only low interference in the neighboring cells. This assumption is valid as a communication entity is connected to a cell with the best uplink channel gain or at least to a cell close to the best uplink channel gain.

In 3GPP R13 MTC work is ongoing to support coverage enhancements of up to 15 dB. This is achieved by time repetition in a TTI (Transmission Time Interval) bundling manner. Up to 3 repetition levels can be supported and the number of repetitions is fixed and may be configurable per cell (and may vary per physical channel). Uplink transmissions, for example, are intended to be scheduled by forward scheduling in which first E-DPCCH (E-DCH Dedicated Physical Control Channel (Enhanced Dedicated Channel)), which includes the uplink grant, is decoded and then the transmission is carried out on the resources pointed out by the uplink grant. The number of repetitions can be over 100 to achieve the 15 dB gain for some channels. Thus, data are transmitted several times in multiple repetitions and the receiving base station accumulates the different repetitions in order to enhance the signal quality.

MTC devices with a low channel gain which may be located in basements can often only produce a limited signal level at the receiving base transceiver station. If they are interfered by a neighbor cell transmission causing high interference levels, e.g. by a normal mobile entity with a high gain to the serving base station, the signal quality of the MTC device at the serving base station will be further reduced. Especially when coverage enhancement is used with a repetition of the transmitted information, the SINR per physical resource of the time repeated signal can be far below that of the interferer. The expression coverage enhancement in the present application means that the same piece of data is sent several times and that, at the receiver, accumulation is used of the same piece of data. Thus, also coverage is reduced. Such a scenario is shown in FIG. 1. An MTC device or communication entity 10 located in a building 11 in the basement has a serving base transceiver station 101. In a neighboring cell, a mobile entity 20 has a serving base transceiver station 100. However, the signal emitted by the mobile entity 20 is also detected by base station 101 serving MTC device 10. In such a scenario, the signal emitted by the mobile entity 20 at base transceiver station 101 can be higher than the signal received at station 101 from MTC device 10.

Accordingly, a need exists to address the above-mentioned problems and to assure that data exchange between base station and communication entity using a low signal level can be assured.

SUMMARY

This need is met by the feature of the independent claims. Further aspects are described in the dependent claims.

According to a first aspect, a method for coordinating a wireless data exchange between communication entities and base transceiver stations in at least one cellular network is provided. According to one step of the method, a need of transmission resources needed for the data exchange between the communication entities and the base transceiver stations controlled by the central control entity is estimated. Furthermore, first resource blocks are determined from the possible resource blocks to which the data exchange between the communication entities and the base transceiver stations should be limited, wherein the possible resource blocks indicate the resource blocks that are available for the data exchange between the communication entities and the base transceiver stations. Furthermore, a maximum interference level is determined that should not be exceeding in the first resource blocks. This maximum interference level takes into account the signal exchange from one of the communication entities to a base transceiver station other than a serving base transceiver station serving said one communication entity. The base transceiver stations are then informed about the first resource blocks and the maximum interference level which should not be exceeded in the first resource blocks.

The method can be carried out by a central control entity or may be performed in a distributed fashion by several entities, e.g. different base transceiver stations which then play the role of a control entity.

With this method, the scheduling can be coordinated between the base transceiver stations. The base transceiver stations receiving the maximum interference level and the first resource blocks can then schedule the traffic in such a way that those communication entities having a signal level lower than the maximum interference level are only scheduled in the first resource blocks where a maximum interference level is not exceeded. Thus, in the first resource blocks the communication entities having a low interference level are only interfered by other communication entities also having low interference levels.

The invention furthermore relates to the corresponding control entity configured to coordinate the wireless data exchange between the communication entities and the base transceiver stations in at least one cellular network. The control entity comprises a processing unit configured to estimate a need of transmission resources needed for the data exchange between the communication entities and the base transceiver stations which are controlled by the control entity. The at least one processing unit is configured to determine the first resource blocks from possible resource blocks and can determine the maximum interference as discussed above. A transmitter is provided configured to inform the base transceiver stations about the resource blocks and the maximum interference level.

The invention furthermore relates to a method carried out to schedule a wireless data exchange with communication entities. The information about first resource blocks is received from the control entity wherein the first resource blocks are the resource blocks from the possible resource blocks in which the maximum interference level should not be exceeded, the possible resource blocks indicating the resource blocks that are available for a data exchange between the communication entities and the base transceiver stations. Furthermore, the maximum interference level is received that should not be exceeded in the first resource blocks. This maximum interference level takes into account the signal exchange from one of the communication entities with a base transceiver station other than a serving base station serving the communication entity. Thus, the first resource blocks are the resource blocks that are only to be used for communication entities generating an interference level lower than the maximum interference level. Furthermore, at least one interference level is determined for said one communication entity served by the base transceiver station wherein the interference level is generated by said one communication entity and at least one neighboring base transceiver station. The at least one determined interference level is compared with the received maximum interference level and if the at least one interference level is lower than the at least one maximum interference level, the data exchange with said one communication entity is scheduled in the first resource blocks.

The method may be carried out by the base transceiver station.

The different communication entities can be scheduled in dependence of the fact whether they generate an interference level which is higher than the received maximum interference level. If a communication entity generates an interference level lower than the maximum interference level, the communication with this communication entity can be scheduled in the first resource blocks. If the interference level is higher, the communication is carried out in other of the possible resource blocks. The invention furthermore relates to the corresponding base transceiver station configured to schedule the wireless data exchange as mentioned above.

It is to be understood that the features mentioned above and features yet to be explained below can be used not only in the respective combinations or embodiments indicated, but also in other combinations or in isolation without departing from the scope of the invention. The features mentioned above or further below and the embodiments may be combined with each other in other embodiments.

BRIEF DESCRIPTION OF THE DRAWINGS

The foregoing and additional feature and effects of the invention will become apparent from the following detailed description when read in conjunction with the accompanying drawings, in which like reference numerals refer to like elements.

DETAILED DESCRIPTION

Figure 1:
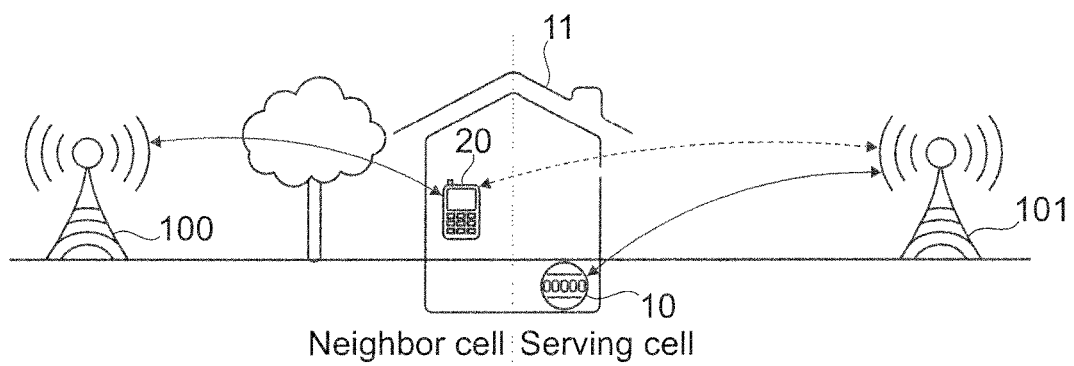
FIG. 1 shows a scenario of interference between a mobile entity and an MTC device.

In the following, embodiments of the invention will be described in detail with reference to the accompanying drawings. It is to be understood that the following description of embodiments is not to be taken in a limiting sense. The scope of invention is not intended to be limited by the embodiments described hereinafter or by the drawings which are taken to be illustrative only.

The drawings are to be regarded as being schematic representations and elements illustrated in the drawings are not necessarily shown to scale. Rather, the various elements are represented such that their function and general purpose becomes apparent to a person skilled in the art. Any connection or coupling between functional blocks, devices, components or other physical or functional units shown in the drawing or described herein may be also implemented by an indirect connection or coupling. A coupling between components may be established over a wired or wireless connection. Functional blocks may be implemented in hardware, firmware, software or a combination thereof.

Hereinafter, a concept is disclosed in which a scheduling between cells is coordinated such that communication entities such as MTC devices or other mobile entities requiring a low interference level and/or having poor coverage are interfered only by devices causing low interference levels. In the following, the expression "communication entity" is to be regarded as a generalized expression including mobile devices (UEs) or MTC devices. The communication entities can include those entities that use a repetition of the transmission signal for coverage enhancement in which the same piece of data is transmitted by a communication entity several times and the receiving entity such as a base transceiver station accumulates the different verification for an enhanced signal level.

This can be achieved by allocating a certain resource block such as a certain time and frequency resource in which the base transceiver stations are only allowed to schedule communication entities causing less than a certain maximum interference level in neighbor base transceiver stations. In these resource blocks, called first resource blocks hereinafter, communication entities such as MTC devices could typically be scheduled since they fall into the category of devices that generate low interference, since the received power in the serving cell is low.

The interference level caused in neighboring cells could be estimated from RSRP (Reference Signal Received Power) measurement from which the channel gain from the serving and neighbor cells can be calculated. The first resource blocks, e.g. the time and frequency resources, could be configured such that the first resource blocks fit the typical bandwidth and duration of an MTC device transmission. This includes a duration that takes into account a number of repetitions or coverage extension level which is often used for MTC devices.

Furthermore, multiple different time and frequency resources may be configured to support different transmission formats.

If the exchanged data transmission is periodic, the reoccurrence period of the low interference resource signal could be set based on the traffic demand and/or delay requirements of the communication entity such as the MTC device and the MTC service. Different patterns could have different periods depending inter alia on the traffic demand for the coverage enhancement level they support.

The solution discussed above and discussed in further detail below in mainly intended for the uplink transmission from the communication entities to the base transceiver station, however, the solution could also be applied in the downlink direction as well.

Figure 2:
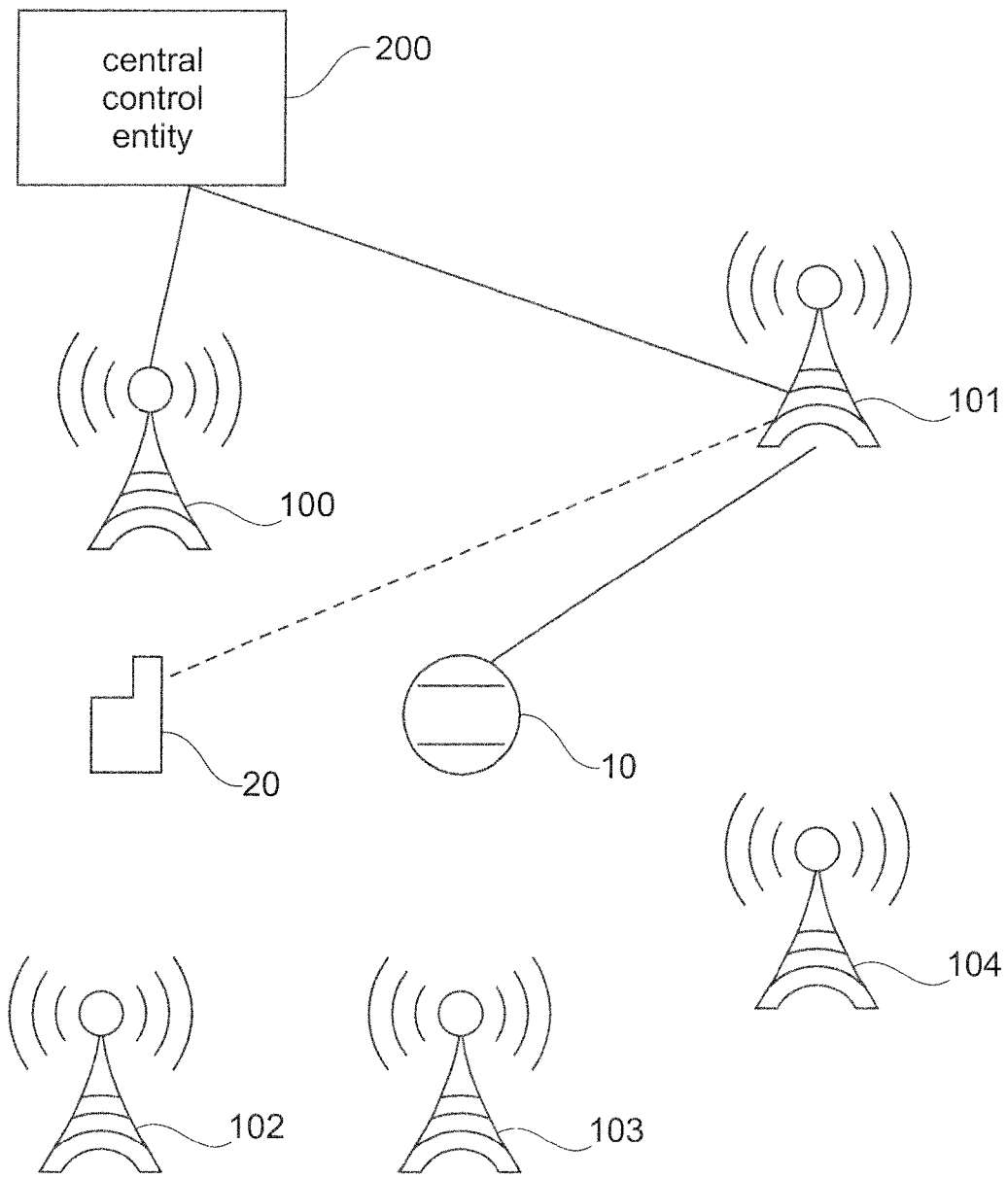
FIG. 2 shows an architectural overview over part of a mobile communications network in which a central control entity coordinates a data exchange of communication entities with the different base stations in such a way that communication entities generating a low interference are scheduled in the same resource blocks.

FIG. 2 shows a schematic representation of part of a mobile communications network in which the coordinated scheduling as shortly introduced above may be used.

The network comprises different base transceiver stations such as base transceiver station 100-104. Furthermore, a central control entity 200 is provided which controls and coordinates the different base transceiver stations. By way of example, the central control entity 200 can be part of an operation and maintenance node of the mobile communications network. However, the central control entity 200 may also be part of another network node, like a core network node or one of the base transceiver stations 100-104, or may be implemented in a virtualized fashion, i.e. not tied to a specific node. An MTC device 10 is shown to be located in the network wherein the MTC device 10 may be a meter monitoring gas or water or electricity consumption. The MTC device 10 could be any other communication entity where a machine-to-machine communication is used wherein the information transmitted by the MTC device 10 is transmitted via the mobile communications network to another entity collecting the different data from different communication entities such as MTC device 10.

The central control entity may also coordinate the interference measurements discussed further below.

Furthermore, a normal or legacy mobile entity 20 is shown. This mobile entity is usually operated by a human being and may move around and is not provided at a fixed location as it is mostly the case of the MTC device 10. However, it should be understood that also the MTC device 10 may not be provided at a fixed location, by way of example if it works as a meter for a device which has no fixed location and where the meter is connected to the device.

In the embodiment shown, the serving base station of MTC device 10 may be base transceiver station 101 and the serving base station for a mobile entity 20 can be base transceiver station 100. However, as the level of the signal emitted by the mobile entity 20 is higher than the level of the signal emitted by MTC device 10, the mobile entity 20 may also generate a signal level at base transceiver station 101 as indicated by the dashed line and which may be higher than the signal level of the MTC device 10.

The central control entity 200 can communicate with each of the different base transceiver stations 100-104. For the sake of clarity, only two connections from the central control entity 200 to the different base transceiver stations are shown. Furthermore, the different base transceiver stations can communicate with one another.

In the following, it is explained in more detail how the transmission resources between the base transceiver stations and the communication entities such as entities 10 and 20 are controlled in such a way that communication entities generating a low interference level at a base transceiver station other than the serving base transceiver station are scheduled together in first resource blocks, wherein the data exchange between a mobile entity and the base transceiver station which would cause a higher interference level is not scheduled in the first resource blocks which are reserved for the signal exchange of low interference levels.

In a first step, a central control entity 200 can estimate the resource need of the transmissions carried out by MTC devices 10. To this end, the central control entity can take into account different repetition levels used by MTC devices 10 in terms of bandwidth and transmit duration. This estimation of the resources can include determination of the highest number of repetitions carried out by the MTC device 10 to transmit the same piece of data. By way of example, if 100 repetitions are the maximum number of repetitions used in order to obtain a coverage enhancement of up to 15 dB, the same number of physical resources will be needed for data exchange. Furthermore, the number of MTC devices controlled by the central control entity 200 can be determined. By way of example, this number can be determined on the information received from the different base transceiver stations 100-104. The base transceiver stations can identify the different MTC entities on the signal levels used by the MTC device or by the fact that signal repetition is used. Based on the number of devices and the maximum number of transmission repetitions, the need of the transmission resources of the communication entity 10 present at a control area in which the central control entity 200 controls the network can be determined. Thus, in this first step the transmission resources are estimated that are needed by communication entities that have an interference level lower than the maximum interference level.

In step 2, the resources, i.e. the first resource blocks, are identified from the possible resource blocks in which the communication of the MTC device 10 should take place. The possible resource blocks are the resource blocks that can be used by the communication entity such as the MTC device 10 to transmit data such as payload data to the base transceiver stations 100-104.

The first resource blocks are characterized by a set of resource blocks such as time and frequency resources, a reoccurrence period and a maximum interference level. The maximum interference level $I_{max}$ may be expressed in absolute power (e.g. dB m) or power relative to the noise level often called noise rise or rise over thermal which is also measured in dB.

The maximum interference level may be determined from the lowest acceptable SINR, which in turn should be dictated by a combination of the detection threshold, number of repetitions and desired coverage enhancement in dB. Apart from the detection threshold it should therefore be configurable to meet a certain design. The interference measurement could be done on the demodulation reference signals (DMRS) on PUSCH over the first resource blocks. It could also be done on the sounding reference signals (SRS) but this spans over the entire device bandwidth and would be less relevant since it is the interference caused on the first resource blocks that is needed. A third alternative would be to estimate it from the PRACH transmission.

In a further step, the maximum interference level or first resource blocks are distributed to the different base transceiver station 100-104. This could be done over messages on the X2 interface connecting the base transceiver stations and/or via the S1 interface connecting the base transceiver stations and a mobility management entity, MME, and/or a Serving Gateway, S-GW. Furthermore, any other signaling for the exchange of information between the central control entity 200 and the different base transceiver stations may be used.

The base transceiver stations 100-104 make an estimate what interference levels its connected communication entities generate in a neighbor cell. Preferably the interference levels are determined in all neighboring cells which either have MTC UEs or support MTC repetition for coverage enhancement. This may be achieved based on RSRP measurements from the communication entities and the received power in the own cell. As an example, if a communication entity d is received in its serving cell 1 with power $P_{d1}$, the generated interference level in a neighbor cell is $I_{d1}=P_{d1}-(RSRP_{d1}-RSRP_{d2})$. The interference measurements from the neighboring cell such as cell 2 in the example above may be either received directly from the neighboring cell or this kind of information may be collected by the central control entity 200 which then distributes the different interference levels to the different base transceiver stations 100-104.

When a limited interference resource occurs, i.e. when another MTC device 10 requests to exchange data with its serving base transceiver station, the corresponding base transceiver station will only schedule communication entities which can generate less interference than the maximum allowed interference limit $I_{max}$ in the first resource blocks. A communication entity fulfills the interference generation criteria if the interference for all base transceiver stations or for a set of nearest neighbors is smaller than $I_{max}$.

The base transceiver stations 100-104 also take the opportunity to schedule only a subset of MTC entities 10, provided that they fulfill the interference generation criteria and fit in the resources provided by the first resource blocks. Here not all the MTC entities 10 located in the area controlled by the central control entity can be scheduled in the first resource blocks. A legacy mobile entity (UE) may also be scheduled in the first resource blocks of the interference levels in the surrounding cells are lower than the maximum interference level. A serving base station can thus initiate interference measurements in surrounding cells before scheduling a UE in the first resource block.

The base transceiver stations may get knowledge of a coverage enhancement level such as 5, 10 or 15 dB used by an MTC entity 10 from a random access procedure. The coverage enhancement level of a device will be made known to the base station from the use of separate PRACH resources (either time, frequency or preambles) for different CE levels. If it is determined that the MTC entity is in one of the coverage enhancement levels, this could be used to trigger RSRP measurements and this could trigger the use of the coordinated scheduling in the first resource blocks for the MTC device 10.

Alternatively, RSRP measurement could be triggered already by the random access transmissions since coverage enhancement levels use separate PRACH (Physical Random Access Channel) resources.

As another alternative, for stationary devices, transmissions could be done on these particular transmission resources used by other mobile entities such as mobile entity 20 and the RSRP measurements could be done on the transmission resources. If the transmissions then meet the low interference requirement, a scheduler provided in the corresponding base transceiver station switches the scheduling of such an MTC device to the first resource blocks for the future exchange.

When a transmission of an MTC entity is scheduled in the first resource blocks where only low interference occurs, a smaller number of repetitions may be needed for the transmission of the signal to the base transceiver station. This has the effect that a possible battery lifetime of an MTC device is increased. Furthermore, with smaller repetitions a higher capacity is obtained meaning a higher number of MTC devices can be scheduled in the first resource blocks.

It is furthermore possible that the coordinated scheduling in first resource blocks and in the other resource blocks may be used for contention based transmission of data in cases of a non-scheduled transmission. The base transceiver stations would have to include information about which time and frequency resources are used for this purpose in the MTC system information.

As can be deduced from the above said, it is advantageous to keep track of communication entities which could generate a large interference. If a mobile entity 20 is to be scheduled in the first resource blocks, it should be assured that its interference level of neighboring cells are low enough. The neighboring cells should then measure on an uplink transmission the signals of the possible interference. Potentially, the interfering mobile entity 20 could be scheduled in other resource blocks then the first resource blocks first and then after the measurements of the interference information, the exchange of data may be switched over to the first resource blocks. Thus, a legacy mobile entity may use the first resource blocks for exchange of data as long as the interference caused at neighboring cells is lower than the allowed maximum interference level.

Figure 3:
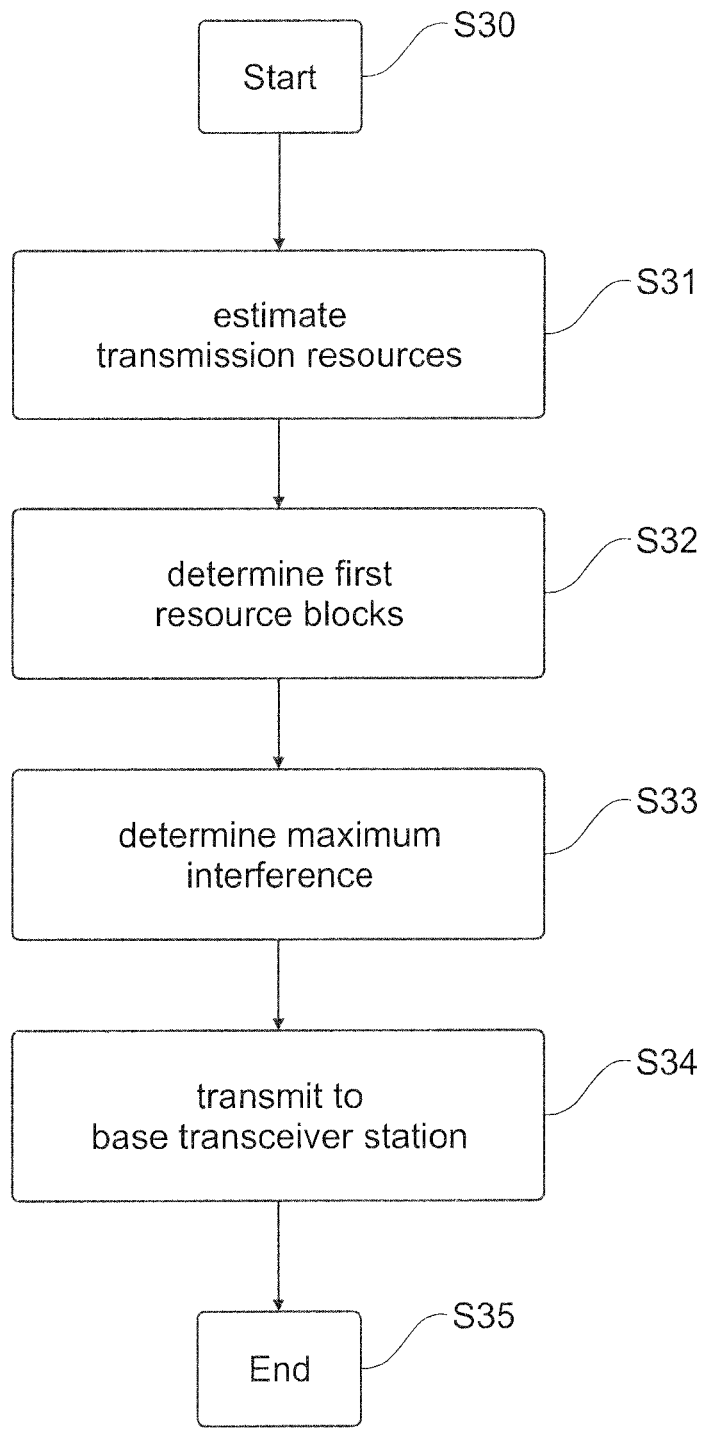
FIG. 3 shows a flowchart comprising the steps carried out by the central control entity of FIG. 2 to coordinate the scheduling of transmission entities.

FIG. 3 summarizes the steps carried out at the central control entity 200. The method starts in step S30 and in step S31 the transmission resources are estimated. In this step the resource needs of the MTC devices 10 controlled by central control entity 200 are estimated. The resource needs may be estimated for different repetition levels.

In step S32, based on the estimated resource needs, the first resource blocks are determined. This means that these resource blocks are identified among the possible resource blocks in which the communication or data exchange between base transceiver station and a communication entity generating a low interference at neighboring base transceiver stations should take place.

Furthermore, in step S33 the maximum interference level allowed in the first resource blocks is determined. In step S34 the information about the first resource blocks and the maximum interference level is transmitted to the different base transceiver stations.

In the method of FIG. 3 a separation is made between a communication entity operating at coverage enhancement with a low SINR and for which the accumulation of the signal over multiple subframes is used, and a legacy mobile entity.

The radio resource or transmission resources may be partitioned into subframes. In a coverage enhancement scenario, consecutive subframes are used to transmit the same piece of data and an accumulation of the subframes is carried out at the receiving side for signal enhancement.

The method ends in step S35.

Figure 4:
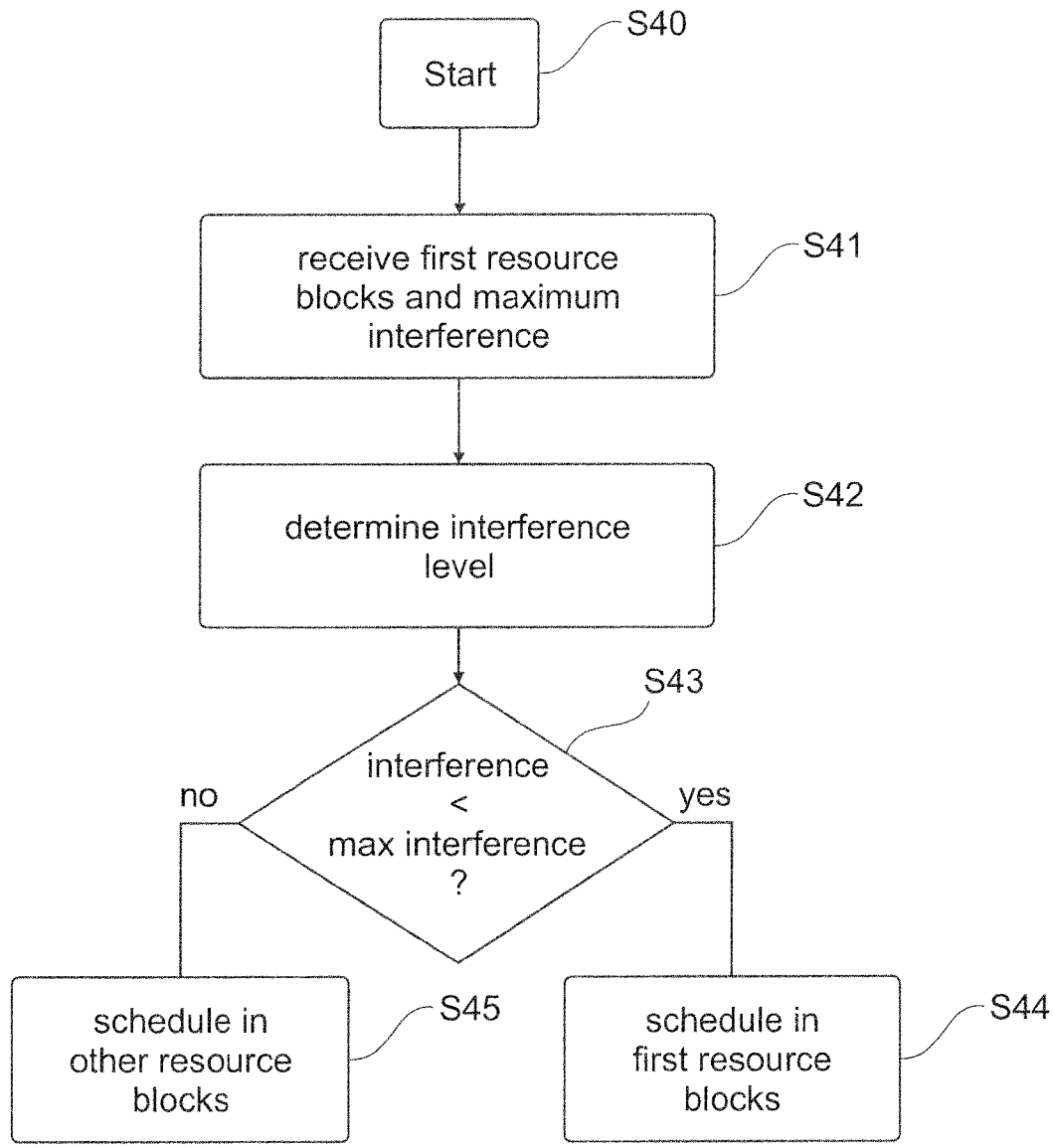
FIG. 4 is a flowchart comprising the steps carried out at a base transceiver station in order to determine how to schedule a data exchange with one of the communication entities in dependence on an interference level.

In FIG. 4 the steps are summarized carried out by the base transceiver stations. In step S40 the method starts and in step S41 the base transceiver stations receive the information about the first resource blocks and the maximum interference. When a communication entity is requesting access to a base transceiver station, an interference level of this communication device is determined in step S42. In this context it is determined what interference level this communication entity generates at other base transceiver stations. In another embodiment the communication entity for which the interference level is determined may be a communication entity not requesting access to the base transceiver station but which is already served by the base transceiver station. However, the data exchange for this communication entity may not take place in the first resource blocks. In step S43 it is determined whether the interference for all the neighboring cells is below the received maximum interference level received in step S41. If this is the case, the base transceiver station may schedule the communication entity in the first resource blocks (step S44). If this is not the case, meaning that the communication entity generates in at least one base transceiver station an interference level higher than the maximum interference level, the base transceiver station will schedule the data traffic for the communication entity in the remaining resource blocks excluding the first resource blocks.

Figure 5:
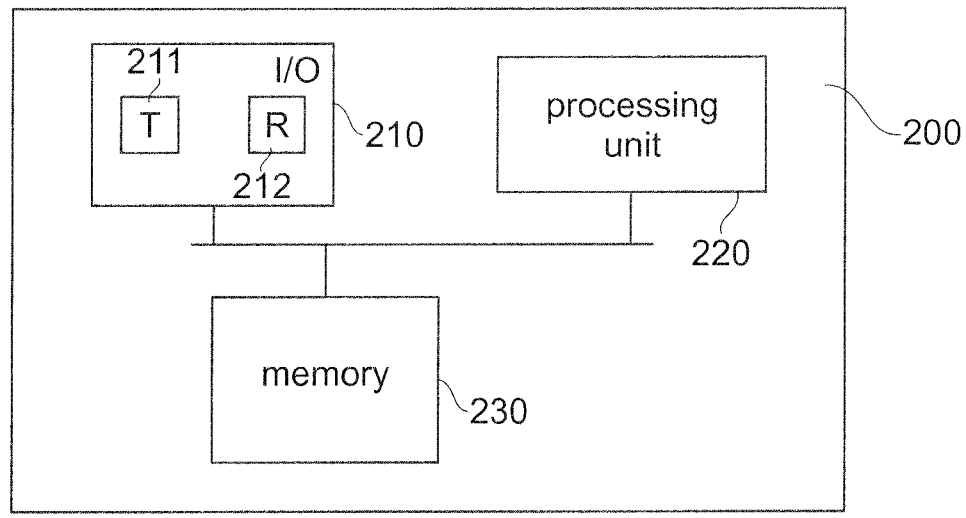
FIG. 5 is a schematic representation of the central control entity used in FIG. 2.
Figure 6:
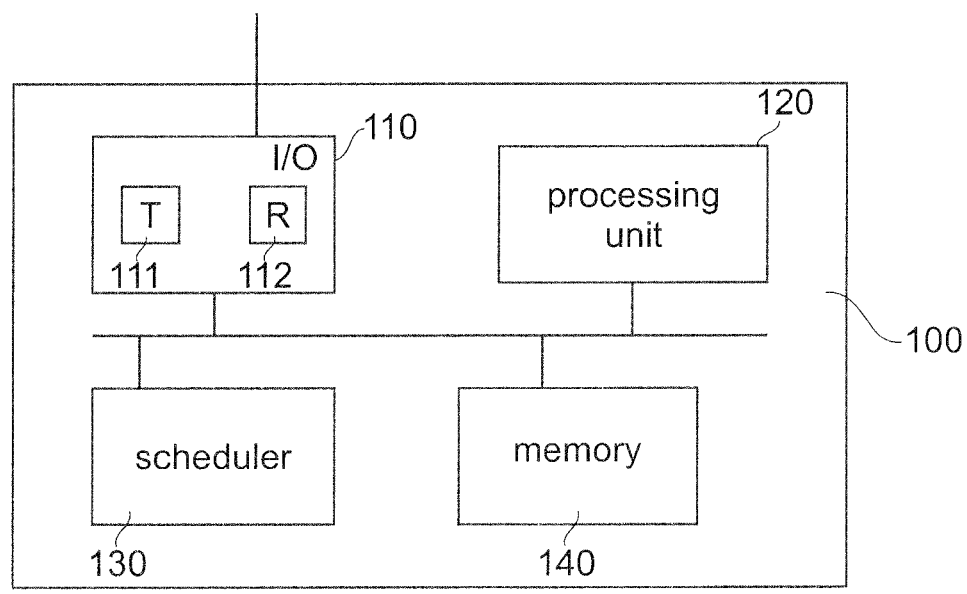
FIG. 6 is a schematic representation of a base transceiver station which schedules data exchange with communication entities in dependence on the interference level.

FIGS. 5 and 6 show schematic representations of the central control entity 200 and 201 of the base transceiver stations respectively. The central control entity 200 shown in FIG. 5 comprises an input/output unit 210 with a transmitter 211 and a receiver 212. The transmitter and the receiver of input/output unit represent the possibility of the central processing unit communicate with other entities inside or outside the mobile communications network and the input/output unit may be configured to work in accordance with the interfaces needed to communicate with the different other node. The transmitter 211 provides the possibility to transmit control messages or user data to other node or entities, the receiver 212 providing the possibility to receive control messages or user data from other nodes or entities.

A processing unit 220 including one or more processors is provided and which is responsible for the operation of the central control entity 200. The processing unit 220 can generate the commands that are needed to carry out the procedures of the central control entity discussed above or below and in which the central control entity in involved. By way of example, the processing unit is designed to estimate the need of transmission resources needed for data exchange of the communication entities, especially of the entities with coverage enhancement which have an SINR lower than usual so that the signal must be accumulated over several subframes at the receiving side, the base transceiver station. Furthermore, the processing unit 220 may determine the first resource blocks and the maximum interference level as discussed above. A memory 230 is provided which may include a read-only memory, a random access memory, a mass storage such as a hard disk or solid state disk or the like. The memory 230 includes suitably configured program code to be executed by the processing unit 220 so as to implement the above-described functionalities.

FIG. 6 shows a schematic view of a base transceiver station. The base transceiver station 100 which is schematically shown for any of the base transceiver stations 100-104 in FIG. 2 comprises an input/output unit 110, a transmitter 111 and a receiver 112. The input/output unit 110 is able to set up a wireless communication to the different communication entities such as the mobile entities 20 or the MTC devices 10. The input/output unit 110 with the transmitter 111 providing the possibility to transmit control messages or user data to other nodes and entities and the receiver 112 providing the possibility to receive control messages or user data from other nodes or entities furthermore provides the possibility to communicate with other base transceiver stations and the central control entity 200 using a wired or wireless connection. Processing unit 120 with one or more processors is responsible for the operation of the base transceiver station as discussed above. The processing unit 120 can generate the commands needed to carry out the features of the base transceiver station 100 discussed above in which the base transceiver station is involved. A scheduler 130 is provided to schedule the transmission resources in such a way that the different communication entities connected to the base transceiver station acting as service base transceiver stations are able to communicate with the base transceiver station. The scheduler 130 will use the information received from the central control entity 200 about the first resource blocks and about the maximum interference level allowed in the first resource blocks. A memory 140 including a memory such as a read-only memory, a flash memory, a random access memory, a mass storage or the like can store the suitable program code to be executed by the processing unit 220 so as to implement the needed functionalities of the base transceiver station.

It is noted that the control entity 200 and/or the base transceiver station 100 may also be implemented in a distributed fashion, i.e. the respective subunits input/output unit 210 resp. 110, processing unit 220 resp. 120, memory 230 resp. 140 and scheduler 130 do not necessarily need to be provided in the same location.

From the above discussion, some general conclusions can be drawn which are summarized below.

The central control entity 200 estimates the need of the transmission resources for the data exchange between the communication entities and the base transceiver stations. In this context, only the communication entities may be considered which are operating in a coverage enhancement operating mode and in which the data are sent with several repetitions for a signal enhancement, wherein the receiving side accumulates the received data for these communication entities operating in the coverage enhancement operating mode.

The determination of the first resource blocks can comprise the determination of time and frequency resource blocks in which the data exchange is to take place. Furthermore it is possible to estimate the number of communication entities located in the area covered by the base transceiver station and to estimate the expected data traffic from this number. The estimation of the transmission resources can furthermore include the step of determining a maximum number of repetitions if the same piece of data is sent from one of the communication entities to the base transceiver station. Here, the highest repetition level is determined which is used by any of the base transceiver stations connected to the central control entity. As the communication entities working in the coverage enhancement operating mode are normally stationary entities, it is possible to predict the expected traffic. Furthermore, the amount of data transmitted by such an MTC entity does not vary to a great extent so that the traffic can be predicted, e.g. based on traffic events detected for these MTC devices in the past.

The central control entity 200 can furthermore collect signal measurements from the base transceiver stations resulting from the data exchange wherein the signal level measurements indicate a signal level in the data exchange transmitted by one of the communication entities and received from several of the base transceiver stations. The collected signal level measurements are then transmitted to the base transceiver stations. The base transceiver stations can then determine, based on the received collected signal level measurements, which interference the different communication entities generate at the other base transceiver stations.

A communication entity working in the coverage enhancement operating mode can use a number of repetitions of the same piece of data in the data exchange transmitted to the serving base transceiver station and the serving base transceiver station uses accumulation of the same piece of data to improve the signal level.

These communication entities working with coverage enhancement have an SINR lower than a usual mobile entity wherein the subframes used for the data exchange and received at the serving base transceiver station are accumulated for enhancing the signal level.

As far as the base transceiver station is concerned, if an interference level for one communication entity is not lower than the received maximum interference level, the data exchange with the corresponding communication entity is not scheduled in the first resource blocks. In this context it is possible that the data exchange with one of the communication entities is only scheduled in the first resource blocks if all of the determined interference levels with the different neighboring base transceiver station are lower than the received maximum interference level. This feature helps to assure that in the first resource blocks only communication entities are transmitting or receiving data which have an interference level at another base transceiver station lower than the determined maximum interference level.

The interference level for one of the communication entities may be determined by determining a received power at which the data from the data exchange from the communication entity is received at the base transceiver station wherein furthermore a reference signal strength at the base transceiver station and at several neighboring base transceiver stations are determined.

The data exchange between a communication entity and the base transceiver station can be periodic. The periodicity of the data exchange of the first resource blocks can be determined taking into account at least one of the data volume of the data exchange and the delay requirements of the data exchange. Here, the reoccurrence period of the resource can be set based on the traffic demand and/or delay requirements wherein different patterns could have different periods depending on the traffic demand of the different implicit entities.

The periodicity can also be considered when the need of transmission resources is estimated.

The above-described application helps to reduce the power consumption at the MTC device as the MTC device does not need to transmit at full power if only data transmissions are scheduled having a low interference level and the same resource blocks. Additionally, it is possible to reduce the number of repetitions of the data transfer so that in total the MTC devices can operate with less power and thus for a longer time.

The invention claimed is:

1. A method for coordinating a wireless data exchange between communication entities and base transceiver stations in at least one cellular network, the method comprising:

estimating a need of transmission resources needed for the data exchange between the communication entities and the base transceiver stations controlled by a central control entity;

determining first resource blocks from possible resource blocks, to which the data exchange between the communication entities and the base transceiver stations should be limited, the possible resource blocks indicating the resource blocks that are available for the data exchange between the communication entities and the base transceiver stations;

determining a maximum interference level that should not be exceeded in the first resource blocks, the maximum interference level taking into account the signal exchange from one of the communication entities with one of the base transceiver stations other than a serving base transceiver station serving the one communication entity;

informing the base transceiver stations about the first resource blocks and the maximum interference level that should not be exceeded in the first resource blocks;

wherein the estimating the need of transmission resources comprises estimating:
 a number of communication entities located in an area covered by the base transceiver stations which are controlled by the central control entity; and
 an expected data traffic between the number of communication entities and the base transceiver stations.

2. The method of claim 1, wherein the determining the first resource blocks comprises determining time and frequency resource blocks in which the data exchange is to take place.

3. The method of claim 1, wherein the estimating the need of transmission resources comprises determining a maximum number of repetitions the same piece of data of the data exchange is sent from one of the communication entities to the base transceiver stations for signal enhancement at the base transceiver stations.

4. The method of claim 1, further comprising:
collecting signal level measurements from the base transceiver stations resulting from the data exchange, the signal level measurements indicating a signal level in the data exchange transmitted by one of the communication entities and received from several of the base transceiver stations;
transmitting the collected signal level measurements to the base transceiver stations.

5. A control entity configured to coordinate a wireless data exchange between communication entities and base transceiver stations in at least one cellular network, the control entity comprising:

processing circuitry configured to:
 estimate a need of transmission resources needed for the data exchange between the communication entities and the base transceiver stations controlled by the control entity; wherein the estimating the need of transmission resources comprises estimating:
 determine a number of communication entities located in an area covered by the base transceiver stations which are controlled by the central control entity; and
 determine an expected data traffic between the number of communication entities and the base transceiver stations;
 determine first resource blocks from possible resource blocks, to which the data exchange between the communication entities and the base transceiver stations should be limited, the possible resource blocks indicating the resource blocks that are available for the data exchange between the communication entities and the base transceiver stations;

determine a maximum interference level that should not be exceeded in the first resource blocks, the maximum interference level taking into account the signal exchange from one of the communication entities with one of the base transceiver stations other than a serving base transceiver station serving the one communication entity;

a transmitter configured to inform the base transceiver stations about the first resource blocks and the maximum interference level that should not be exceeded in the first resource blocks.

6. The control entity of claim 5, wherein the communication entities use a number of repetitions of the same piece of data of the data exchange transmitted to the serving base transceiver station; wherein the serving base transceiver station uses accumulation of the same piece of data.

7. The control entity of claim 5, wherein the communication entities are user terminals using a signal level for the data exchange which is lower than that of a legacy mobile entity; wherein subframes are used for the data exchange and the subframes received at the serving base transceiver station are accumulated for enhancing the signal level.

8. A non-transitory computer readable recording medium storing a computer program product for coordinating a wireless data exchange between communication entities and base transceiver stations in at least one cellular network, the computer program product comprising software instructions which, when run on processing circuitry of a control entity, causes the control entity to:

estimate a need of transmission resources needed for the data exchange between the communication entities and the base transceiver stations controlled by the control entity;

determine first resource blocks from possible resource blocks, to which the data exchange between the communication entities and the base transceiver stations should be limited, the possible resource blocks indicating the resource blocks that are available for the data exchange between the communication entities and the base transceiver stations;

determine a maximum interference level that should not be exceeded in the first resource blocks, the maximum interference level taking into account the signal exchange from one of the communication entities with one of the base transceiver stations other than a serving base transceiver station serving the one communication entity; and inform the base transceiver stations about the first resource blocks and the maximum interference level that should not be exceeded in the first resource blocks;

wherein the estimating the need of transmission resources comprises estimating:

a number of communication entities located in an area covered by the base transceiver stations which are controlled by the central control entity; and an expected data traffic between the number of communication entities and the base transceiver stations.

* * * * *